United States Patent
Kohlberger et al.

(10) Patent No.: US 9,112,208 B2
(45) Date of Patent: Aug. 18, 2015

(54) MODULAR BATTERY STRUCTURE

(75) Inventors: Markus Kohlberger, Stuttgart (DE); Michael Moser, Rainau (DE); Heiko Neff, Stuttgart (DE); Caroline Schmid, Stuttgart (DE); Hans-Georg Herrmann, Stuttgart (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 624 days.

(21) Appl. No.: 13/414,359

(22) Filed: Mar. 7, 2012

(65) Prior Publication Data

US 2012/0224326 A1 Sep. 6, 2012

Related U.S. Application Data

(63) Continuation of application No. PCT/EP2010/063057, filed on Sep. 6, 2010.

(30) Foreign Application Priority Data

Sep. 7, 2009 (DE) .......................... 10 2009 040 197

(51) Int. Cl.
*H01M 10/00* (2006.01)
*H05K 7/20* (2006.01)
*H01M 2/10* (2006.01)
*H01M 10/625* (2014.01)
*H01M 10/6556* (2014.01)
(Continued)

(52) U.S. Cl.
CPC .......... *H01M 2/1083* (2013.01); *H01M 2/1077* (2013.01); *H01M 10/613* (2015.04); *H01M 10/625* (2015.04); *H01M 10/656* (2015.04); *H01M 10/6556* (2015.04); *H01M 10/647* (2015.04); *H01M 10/6557* (2015.04); *H01M 10/6566* (2015.04)

(58) Field of Classification Search
CPC ............ H01M 2/1083; H01M 2/1077; H01M 10/025; H01M 10/06556; H01M 10/613; H01M 10/656
USPC ........................................................ 429/122
See application file for complete search history.

(56) References Cited

U.S. PATENT DOCUMENTS

| 5,613,569 A | 3/1997 | Sugioka et al. |
| 7,045,236 B1 * | 5/2006 | Andrew et al. ................. 429/83 |

(Continued)

FOREIGN PATENT DOCUMENTS

| CN | 2632867 Y | 8/2004 |
| CN | 1953240 A | 4/2007 |

(Continued)

OTHER PUBLICATIONS

Chinese Office Action for Chinese Application No. 201080039642.2 dated Feb. 11, 2014 with English translation.

(Continued)

*Primary Examiner* — Karie O'Neill Apicella
(74) *Attorney, Agent, or Firm* — Muncy, Geissler, Olds & Lowe, P.C.

(57) ABSTRACT

A module system is provided that includes at least one module support and at least one module support and at least one energy storage module that is connected to the at least one module support. The module support and the energy storage module have cooling fluid connections, electric contacts, and coupling elements that are adapted to each other.

10 Claims, 6 Drawing Sheets

(51) Int. Cl.
*H01M 10/613* (2014.01)
*H01M 10/656* (2014.01)
*H01M 10/647* (2014.01)
*H01M 10/6557* (2014.01)
*H01M 10/6566* (2014.01)

(56) References Cited

U.S. PATENT DOCUMENTS

| | | |
|---|---|---|
| 7,746,034 B2 | 6/2010 | Lee et al. |
| 2004/0058233 A1 | 3/2004 | Hamada et al. |
| 2004/0096715 A1 | 5/2004 | Herdtle et al. |
| 2007/0141459 A1 | 6/2007 | Goto et al. |
| 2008/0050645 A1 | 2/2008 | Kai et al. |
| 2008/0090137 A1 | 4/2008 | Buck et al. |
| 2008/0124618 A1 | 5/2008 | Shimoyama |
| 2009/0152034 A1* | 6/2009 | Takasaki et al. ............. 180/68.5 |
| 2010/0236854 A1 | 9/2010 | Nakamura |

FOREIGN PATENT DOCUMENTS

| | | |
|---|---|---|
| CN | 101027809 A | 8/2007 |
| CN | 101443950 A | 5/2009 |
| DE | 25 58 456 A1 | 6/1977 |
| DE | 10 2008 034 887 A1 | 6/2009 |
| EP | 2 017 919 A1 | 1/2009 |

OTHER PUBLICATIONS

Chinese Office Action for Chinese Application No. 201080039642.2 dated Aug. 26, 2014 with English translation.

Peter Pichler, "The Impact of Simulation Analysis on the Development of Battery Cooling Systems for Hybrid Vehicles," Advanced Automotive Battery Conference, 2008.

* cited by examiner

MODULAR BATTERY STRUCTURE

This nonprovisional application is a continuation of International Application No. PCT/EP2010/063057, which was filed on Sep. 6, 2010, and which claims priority to German Patent Application No. DE 10 2009 040 197.0, which was filed in Germany on Sep. 7, 2009, and which are both herein incorporated by reference.

BACKGROUND OF THE INVENTION

1. Field of the Invention

The present invention relates to a module support for a modular system, an energy storage module for a modular system, and a modular system.

2. Description of the Background Art

High-performance energy storage devices such as, for example, Li-ion or NiMH accumulators or supercaps are used in modern HEV/EV vehicles. Heating occurs in these during rapid charging and discharging due to resistances within and outside the cells. Temperatures above 50° C. damage the energy storage devices permanently. To assure the function of the energy storage devices, they must be cooled. To this end, the energy storage devices are brought into thermal contact with a plate through which a cooling medium or coolant flows and are thus cooled.

During the cooling of the cells, it is important that all cells are cooled uniformly. With a nonuniform cooling of the cells, the cells age at a different rate, and this has a negative effect on the function and performance of the energy storage devices. Furthermore, the described energy storage devices are to be connected mechanically to the vehicle to assure a secure mounting and to prevent damage to the energy storage devices. In this case, both the forces to be applied and arising forces and accelerations must be absorbed and corresponding geometric tolerances of the energy storage devices must be bridged. The affected energy storage devices can be made in this case according to any design depending on the intended application.

The currently generally used cooling systems for the aforementioned accumulator systems usually comprise a structural form highly adapted to the particular application, which relates to the number of cells, energy content, and cooling. The cooling in particular in this case is made as a single plate or a plurality of plates through which a cooling medium or coolant flows and which generally serve the entire accumulator system.

The presentation "The Impact of Simulation Analysis on the Development of Battery Cooling Systems for Hybrid Vehicles" by Peter Pichler, Product Manager, Battery Systems, MAGNA STEYR Fahrzeugtechnik AG & Co. KG, at the AABC (Advanced Automotive Battery Conference) in 2008 describes a modular battery structure, in which the heat sink is already integrated into the modules, however. Only the connection of the individual cooling channels is shown in the final battery assembly.

U.S. Pat. Appl. No. 2008/0090137 A1 describes a modular structure for a battery in which the module has cells and cooling sheets. The finished battery is cooled with air.

The modules already contain the cooling channels or evaporator plate. When individual modules are replaced, in addition to the electrical and mechanical connections, the coolant connections as well between the individual modules must be separated. This increases the cost for the replacement of individual modules considerably and harbors the risk of leaks.

The state of the art is based very heavily on accumulator and cooling systems that are adapted to the particular application and whose development and production is very complicated and costly, inter alia, because of the thus far still relatively low quantities.

SUMMARY OF THE INVENTION

It is therefore an object of the present invention provide an improved accumulator and cooling system, for example, for a vehicle.

In an embodiment, it is proposed to provide an integration of all key functions at a cell module level, thus cooling and thermal and electrical contacting. A fundamental idea is the development of a standard module with a low adaptation cost for alternative cell sizes and with high quantities. Important key points in this regard are a high modularity, very rapid and simple replaceability of cell modules in the event of damage, and advantageous production owing to the high standardization and low application cost.

The present invention is based on the realization that because of a considerable increase in the degree of modularization of accumulator and cooling systems, a system can be created that is based on a small, uniform assembly group, which already comprises, for example, all relevant interfaces, particularly an electrical, a mechanical, and a thermal interface. This unit can be expanded as desired and adapted at very low cost to the specific application. In addition, a more economic and cost-effective fabrication and development can be achieved owing to the higher quantities resulting therefrom.

The above-described object of the invention can be attained by a more or less small base unit. The base unit has an assembly group, which contains one or more energy storage devices and the necessary interfaces. In this case, the electrical, mechanical, and thermal interfaces can already be integrated into said base unit. Said base unit in turn can be integrated into a base frame, which can accommodate one or more base units and be expanded as desired according to the specific application. The invention represents a novel design of battery systems for hybrid and electrical applications with a high modularity as an alternative to conventional structural designs.

A battery system with a relatively small installation space and weight can be realized with the concept of the invention. This type of system is also characterized by a high flexibility relative to the design. According to the inventive approach, identical elements can be produced in large quantities, whereby a greater economy of the production can be achieved. A modular accumulator and cooling system according to the inventive approach enables a lower application effort for the individual application and thereby shorter development times. The introduction and transmission of force and a tolerance compensation in the energy storage units are advantageously combined in a single concept. Finally, an accumulator and cooling system, produced and used according to the inventive approach, is characterized by a substantially greater maintenance and service friendliness.

According to an embodiment of the invention, galvanic cells, particularly Li-ion cells, are connected to a mechanical module. These modules can be connected electrically parallel and/or in series by means of removable cell connector boards and connected to a heat sink. The modules can be separated individually from the cooling plate and replaced with little effort in the event that one or more cells are faulty. The cooling plate and cell connector boards can therefore be reused. Different cooling plates can be installed according to the application.

The cell modules represent only a mechanical connection of the cells. Cell connector boards and cooling plates can be retained during the replacement of individual modules. In the case of damage, this reduces the cost of the battery replacement considerably, because only individual modules need to be replaced, and a new connection of cooling channels is not necessary. Specific batteries can be assembled from identical cell modules depending on (performance) requirements.

The present invention creates a module support for a modular system in which a plurality of energy storage modules can be held by at least one module support, whereby each energy storage module may have two module-side cooling fluid connections, a module-side electrical contact, and a module-side coupling element, whereby the module support may have the following features: a support housing with two side walls opposite to one another; a cooling channel for carrying a cooling fluid, whereby the cooling channel can be arranged in the support housing and run between the side walls; two support-side cooling fluid connections, which can be formed to be connected to the module-side cooling fluid connections, whereby the support-side cooling fluid connections can be arranged in one of the side walls of the support housing and connected to the cooling channel; a support-side electrical contact, which can be formed to be connected to the module-side electrical contact; a channel for carrying an electrical line to the support-side electrical contact, whereby the channel can be arranged in the support housing and run between the side walls; and a support-side coupling element, which can be formed to be connected to the module-side coupling element, so that the energy storage module can be held on one of the side walls and the support-side cooling connections are connected fluid-tight to the module-side cooling fluid connections.

The module support can be a sub-element of an assembly system and be formed to accommodate one or a plurality of energy storage modules. The cooling fluid connections, electrical contacts, and coupling elements can be predefined interfaces of a modular assembly system. This means that the positions and embodiments of the interfaces at the individual base units or base frames, therefore, the module support and the energy storage module, of the assembly system, are predefined. The module-side connections thereby in each case form a counterpart to the support-side connections. The interfaces can be designed so that the desired electrical, mechanical, or thermal connection is assured by a simple joining, for example, by the pushing together or hooking, of the base unit into the base frame.

According to an embodiment, the cooling channel and the channel for carrying an electrical line can be arranged adjacent to one another in the support housing. To this end, a common or separate guide channels can be provided.

According to another embodiment, the support-side cooling fluid connection may have a flange. This enables an easy-to-use and nevertheless fluid-tight connection between the module and support.

Further, the support-side coupling element can be formed as at least one rail, which is arranged substantially at right angles to the side walls of the support housing. Thus, the energy storage module can be held by means of insertion of the module-side coupling element into the at least one rail.

Alternatively, the support-side coupling element can be formed as a device for receiving a hooking element. The device for receiving a hooking element can be arranged on one of the side walls of the support housing, so that the energy storage module can be held by means of hooking of the module-side coupling element into the device for receiving a hooking element. In this regard, the interfaces can be made so that the desired connection can be realized during the hooking movement.

Further, the support housing may have at least one connecting element, which can be formed to connect the module support to another module support, so that the cooling channels of the module support and the additional module support are connected. The system can be expanded as desired in this way.

According to an embodiment, each of the two opposite side walls may have at least one support-side cooling fluid connection, at least one support-side electrical contact, and at least one support-side coupling element. In this way, modules can be arranged on both sides of the support.

The present invention further provides an energy storage module for a modular system in which a plurality of energy storage modules can be held by at least one module support, whereby each module support may have two support-side cooling fluid connections, a support-side electrical contact, and a support-side coupling element, and whereby the energy storage module can be formed to accommodate at least one electrochemical energy storage unit and may have the following features: a cooling plate with a plurality of cooling fluid channels, whereby the cooling plate can form a base plate of the energy storage module; at least one holding surface for forming a wall region of the energy storage module; two module-side cooling fluid connections, which can be formed to be connected to the support-side cooling fluid connections, and whereby the module-side cooling fluid connections can be coupled to the cooling fluid channels of the cooling plate; a module-side electrical contact, which can be formed to be connected to the support-side electrical contact, and whereby the module-side electrical contact can be connected to the at least one electrochemical energy storage unit; a module-side coupling element, which may be designed to be connected to the support-side coupling element, so that the energy storage module can be held on one of the side walls of the support housing of the module support and the module-side cooling fluid connections are connected fluid-tight to the support-side cooling fluid connections.

The electrochemical energy storage unit can be, for example, Li-ion or NiMH accumulators, supercaps, or galvanic cells in general. One or more of the energy storage units can be arranged on the cooling plate, and thus be cooled by said plate. The connection between the energy storage units and the cooling plate can be loose, so that a defective energy storage unit can be easily replaced. The holding surface can be formed to encompass and to fix the energy storage units on the side. The holding surface can be made as a holding sheet of metal or alternatively of plastic.

According to an embodiment, the energy storage module can have two cooling fluid boxes. In this regard, one each of the module-side cooling fluid connections can be arranged at one each of the cooling fluid boxes. Accordingly, the energy storage module can also have two holding sheets. The holding sheets can each be arranged between one of the cooling fluid boxes and the cooling plate and in each case have a through opening for conveying the cooling fluid between the respective cooling fluid box and the cooling fluid channels. The cooling fluid boxes provide a way for supplying and removing the cooling fluid conducted through the cooling plate.

For example, the module-side coupling element can be formed as a rail element. This can be arranged at at least one of the water boxes, so that the rail element can be inserted into the support-side coupling element.

Alternatively, the module-side coupling element can be formed as a hooking element. The hooking element can be arranged at the holding sheet of the energy storage module, so that the hooking element can be hooked into the support-side coupling element.

Finally, the present invention provides a modular system having at least one module support of the invention and at least one energy storage module of the invention, which can be connected to the at least one module support.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of the preferred exemplary embodiments of the present invention, the same or similar reference symbols are used for the elements with a similar action and shown in the different drawings, whereby a repeated description of these elements is omitted.

Figure 1:
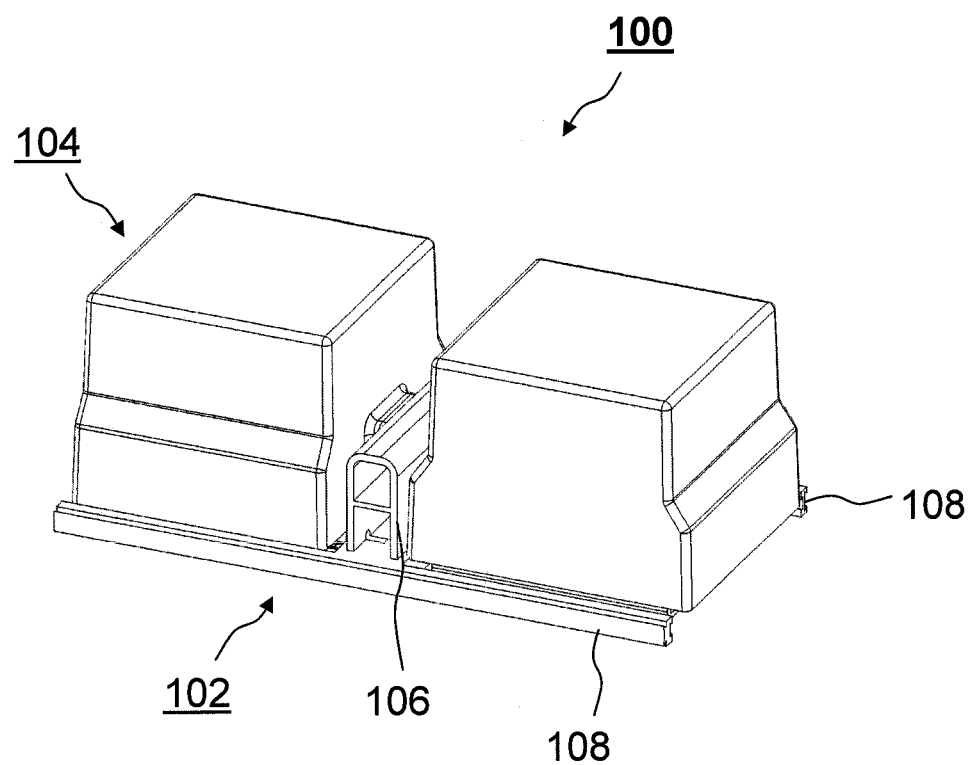
FIG. 1 is a perspective view of a modular system according to an exemplary embodiment of the invention.

FIG. 1 shows a perspective view of a modular system 100 according to an exemplary embodiment of the invention. Shown is a module support 102, which supports two energy storage modules 104. Module support 102 has a support housing 106 with two opposite side walls and two rails 108, which are arranged in each case approximately at right angles to support housing 106 and in each case extend in opposite directions away from support housing 106. Each of energy storage modules 104 is arranged adjacent to one of the side walls of support housing 106. Energy storage modules 104 can be connected to module support 102 by insertion into rails 108, in each case from opposite directions.

Figure 2:
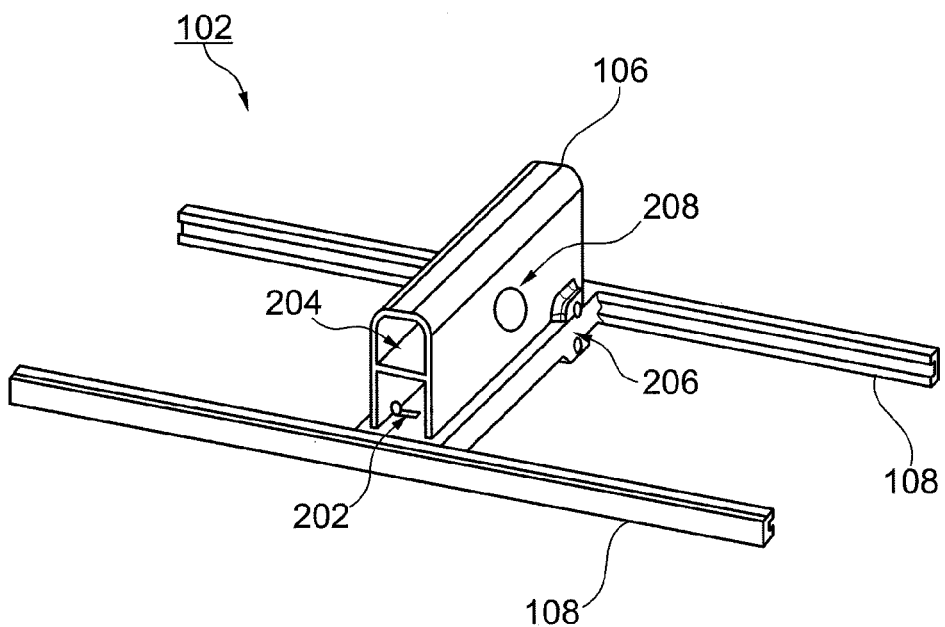
FIG. 2 is a perspective view of a module support according to an exemplary embodiment of the invention.

FIG. 2 shows a perspective view of module support 102 of FIG. 1. Module support 102 is formed as a modular holding frame for two 6-module [units] with an integrated collection channel for the cooling medium and electrical lines. The structure of holding frame 102 in turn comprises support housing 106 and two rails 108. The integrated collection channel of module support 102 is arranged in support housing 106 and has a cooling channel 202 for carrying a cooling medium and a channel 204 for carrying electrical components. In addition, module support 102 has a cooling fluid connection 206 and an electrical contact 208.

Cooling channel 202 and channel 204 for carrying the electrical components run in a longitudinal direction of support housing 106 and are separated from one another by a housing crosspiece. In FIG. 2, channel 204 for carrying the electrical components runs above cooling channel 202. Cooling fluid connection 206 at the level of cooling channel 202 penetrates the side wall of support housing 106. Cooling fluid connection 206 has a connecting flange to enable a fluid-tight transition for the cooling medium between cooling channel 202 and another element, for example, an energy storage module. In the exemplary embodiment shown in FIG. 2, another cooling fluid connection 206 is arranged below cooling fluid connection 206. Electrical contact 208 penetrates the side wall of support housing 106 at the level of channel 204 to carry the electrical components. Electrical contact 208 is formed as a plug-in connector for the power current and data exchange. With insertion of a module in module support 102, by means of the integrated connecting flange, an automatic electrical and hydraulic contacting of the energy storage module can be achieved via interfaces 206, 208.

The two rails 108 are each arranged on opposite ends of the side walls of support housing 106 and extend away from the support housing each in opposite directions. Rails 108 may have grooves for receiving energy storage modules. In the perspective view of module support 102, an opposite additional side wall is not visible, which may have an additional electrical contact 208 and one or more additional cooling fluid connections 206.

Figure 3:
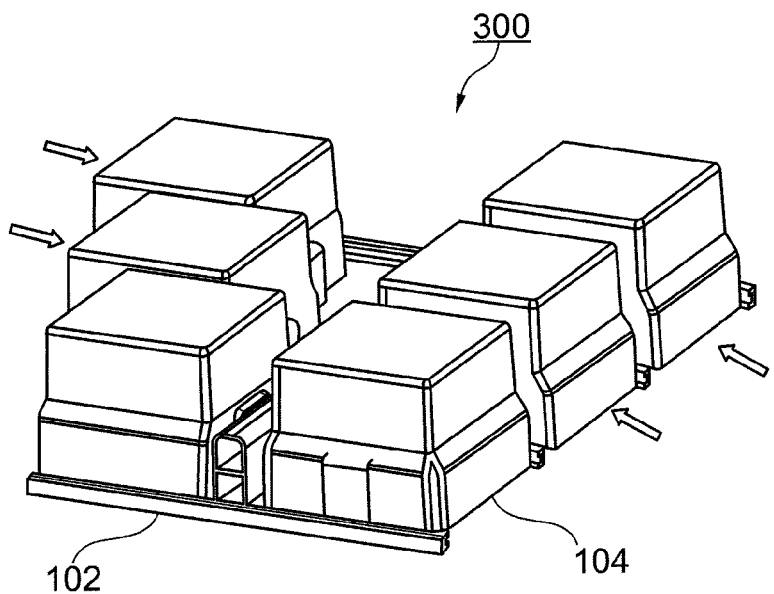
FIG. 3 is a perspective view of a formation of an expanded modular system according to an exemplary embodiment of the invention.

FIG. 3 shows a structure of a modular system 300 according to an exemplary embodiment of the invention. It can be seen in FIG. 3 that by means of an assembly of a plurality of holding frames 102, the modules can be expanded in series to a number of four, six, eight, etc. Thus, a design of modular system 300 can be realized which is suitable for the most diverse applications. The arrows in FIG. 3 indicate a horizontal mounting direction of energy storage modules 104, which are fastened by insertion into the rails of the assembled module supports 102 on the support housings of module supports 102. A mounting direction of cell modules 104 is conceivable both in the horizontal and in the vertical direction.

Figure 4:
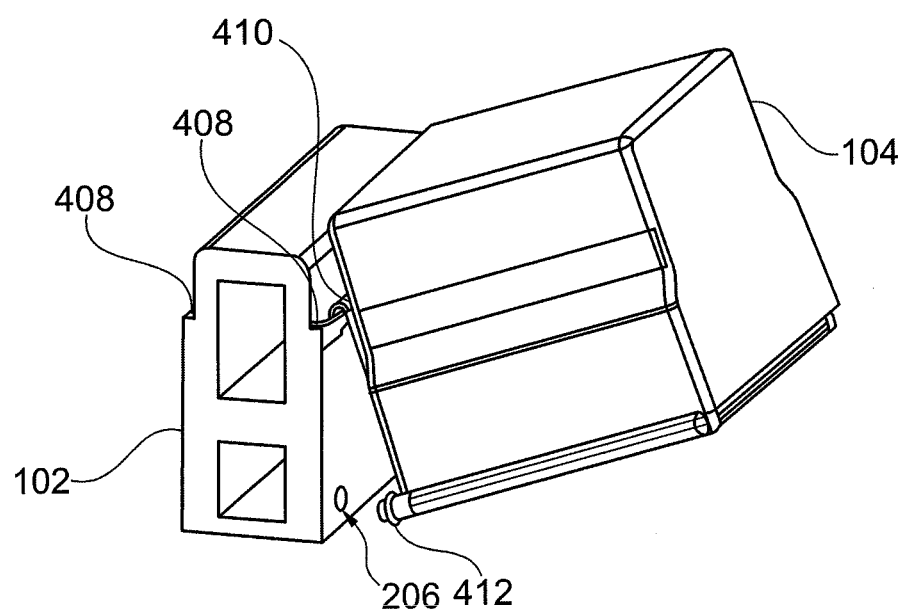
FIG. 4 is a perspective view of a production step for a hooking connection of an energy storage module with a module support according to an exemplary embodiment of the invention.
Figure 5:
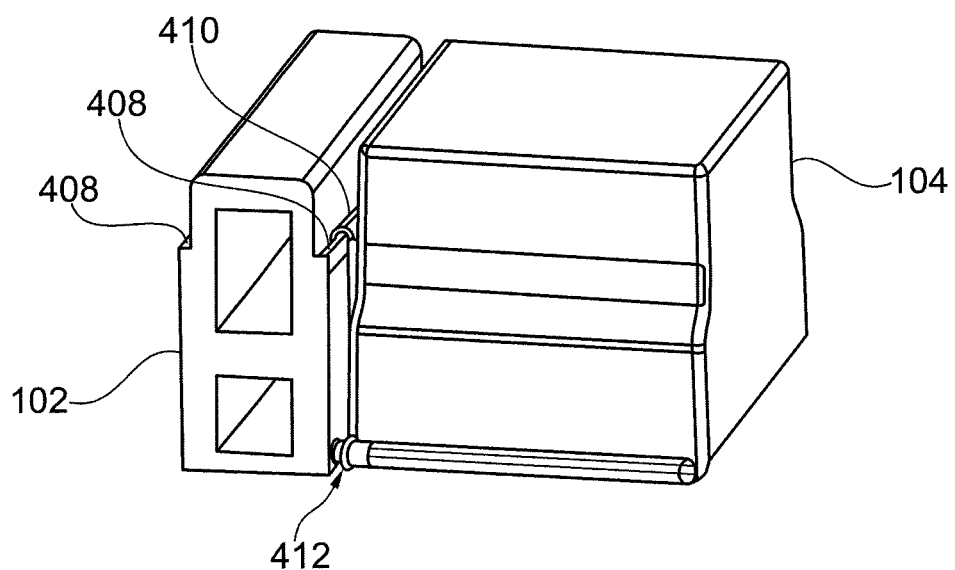
FIG. 5 is a perspective view of another production step for a hooking connection of an energy storage module with a module support according to an exemplary embodiment of the invention.

FIGS. 4 and 5 show an alternative attachment option between the module support and energy storage module by means of hooking of a retaining lug and subsequent swiveling in.

FIG. 4 shows a perspective view of a mounting step for a hooking connection between an energy storage module 104 and a module support 102 according to an exemplary embodiment of the invention. The exemplary embodiment of module support 102 as shown in FIG. 4 differs from the exemplary embodiment of module support 102 as shown in the preceding figures in that the support-side coupling element of module support 102 is formed not as rails but as a hooking ledge or hooking groove 408. Accordingly, the exemplary embodiment of energy storage module 104 as shown in FIG. 4 has on one side a hooking element 410, which is designed to be hooked into hooking ledge or hooking groove 408. Accordingly, FIG. 4 shows a mechanical connection of energy storage module 104 to module support 102 via a hooking of hooking element 410 into hooking ledge or hooking groove 408. It can also be seen in FIG. 4 that module support 102 has the support-side cooling fluid connection 206 and energy storage module 104 has a module-side cooling fluid connection 412.

FIG. 5 shows a perspective view of another production step for the hooking connection of an energy storage module with a module support according to the exemplary embodiment already shown in FIG. 4. The view in FIG. 5 shows that in addition to the mechanical connection there now is also a hydraulic connection between support module 102 and energy storage module 104. The module-side cooling fluid connection 412 is inserted into the support-side cooling fluid connection 206. A fluid-tight connection between energy storage module 104 and support module 102 is created by a flange of the module-side cooling fluid connection 412.

An automatic attachment by means of hydraulic connections 206, 412 is thus possible by the connecting steps shown in FIGS. 4 and 5.

Figure 6:
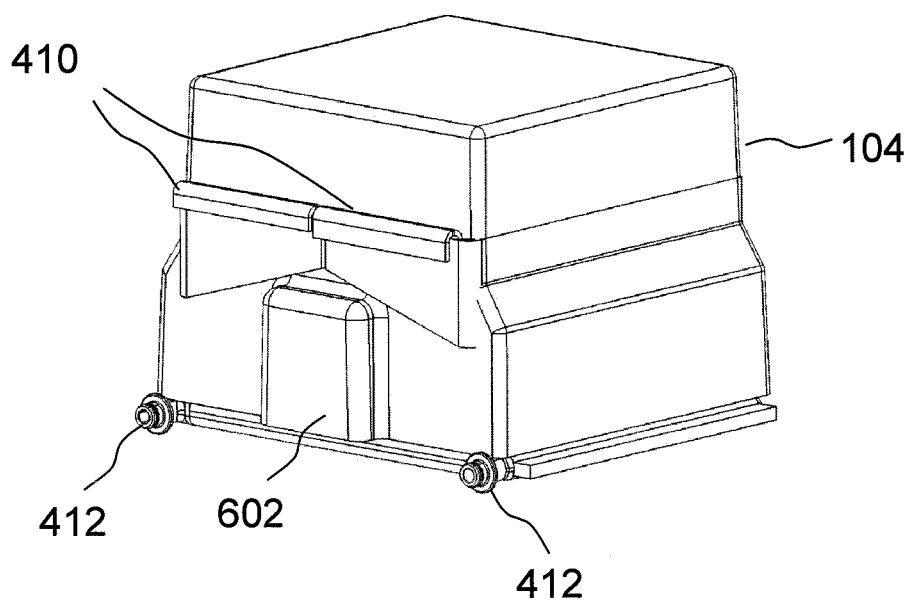
FIG. 6 is a perspective view of an energy storage module according to an exemplary embodiment of the invention.

FIG. 6 shows a perspective view of energy storage module 104 as an exemplary embodiment of the hooking variant with a module cover. Two hooking elements 410 and two cooling fluid connections 412 of energy storage module 104 can be clearly seen. Also shown in FIG. 6 is an electrical contact 602 of energy storage module 104, which can be connected to an electrical contact of a module support.

Figure 7:
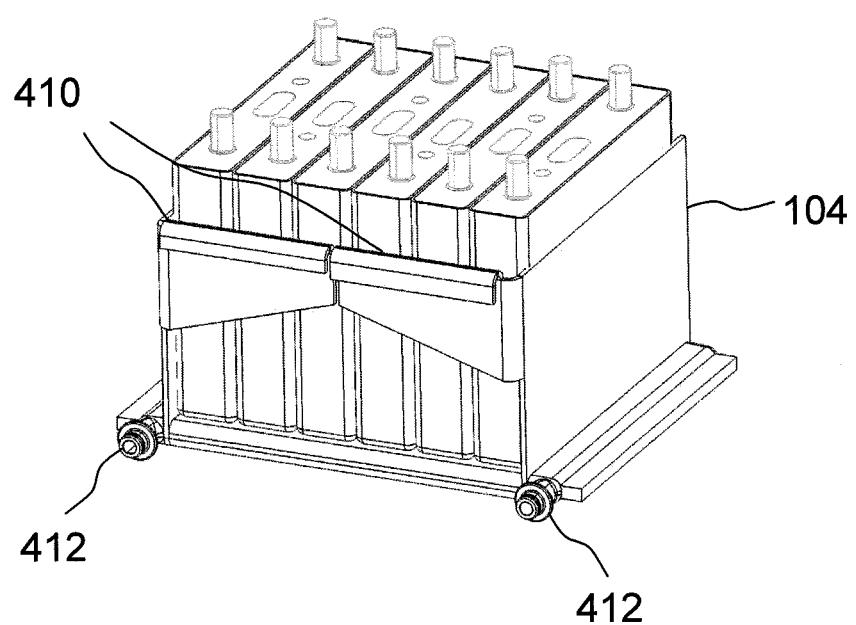
FIG. 7 is a perspective view of a part of the energy storage module of FIG. 6 and electrochemical energy storage units, arranged within the housing, according to an exemplary embodiment of the invention.

FIG. 7 in turn shows the exemplary embodiment of the hooking variant, whereby parts of energy storage module 104 and the module cover have been left out, so that an interior view of energy storage module 104 is made possible. The exemplary embodiment of energy storage module 104 as shown in FIG. 7 is equipped with six electrochemical energy storage units. In other exemplary embodiments of energy storage module 104, other quantities of electrochemical energy storage units are possible.

Figure 8:
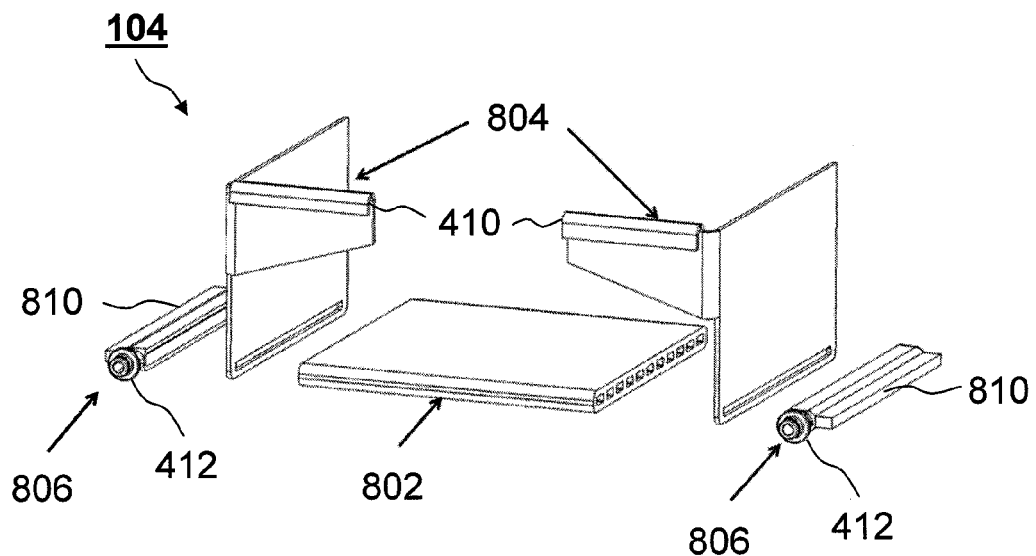
FIG. 8 is an exploded perspective view of elements of an energy storage module according to an exemplary embodiment of the invention.

FIG. 8 shows in an exploded perspective view an exemplary embodiment of a structure of the hooking variant of cell module 104. Shown are a cooling plate 802, two holding sheets 804, and two cooling fluid boxes 806 each with a cooling fluid connection 412.

Cooling plate 802 has cooling fluid channels, which can be arranged parallel to one another and can pierce cooling plate 802 in a longitudinal direction. Cooling plate 802 can be formed, for example, with a layered sheet structure. In addition, there are still further design options; e.g., cooling plate 802 can be made from an extruded profile. Holding sheets 804 has a larger and a smaller wall, which are connected to one another substantially at right angles. In this case, the larger wall has at a lower edge a longitudinal opening, which extends virtually over a side length of the wall. An area of the smaller wall decreases toward one end of the wall. The smaller wall has at its upper edge a bend, which forms hooking element 410 of the hooking variant of energy storage module 104. Holding sheets 804 are used for cell module attachment and cell bracing. Optionally, the holding sheets can also be designed to assume an additional cooling task. Cooling fluid boxes 806 are formed as elongated containers, which in each case provide at one end a cooling fluid connection 412. Cooling fluid boxes 806 are open at one of the long sides, so that an exchange of the cooling fluid with cooling plate 802 is possible. On one side opposite to the open long side, water boxes 412 each have a rail element 810, so that energy storage module 104 in an assembled state can be inserted into the rails of a module support.

To mount cell module 104, holding sheets 804 are arranged between opposing ends of cooling plate 802 and one each water box 806. Each of holding sheets 804 is arranged in this regard so that the longitudinal opening of holding sheet 804 lies between the openings of the cooling fluid channels in cooling plate 802 and the open side of the respective cooling fluid box 806. The smaller walls of holding sheet 804 are oriented in this case so that they point at one another. In the assembled state, cooling plate 802 and the two holding sheets 804 thus form the base plate and side walls of a housing for the suitable holding of a number of electrochemical energy storage units. To connect the elements, finally water boxes 806 are attached to holding sheets 804, so that cooling fluid boxes 806 are connected via the longitudinal openings of holding sheets 804 to cooling plate 802.

Figure 9:
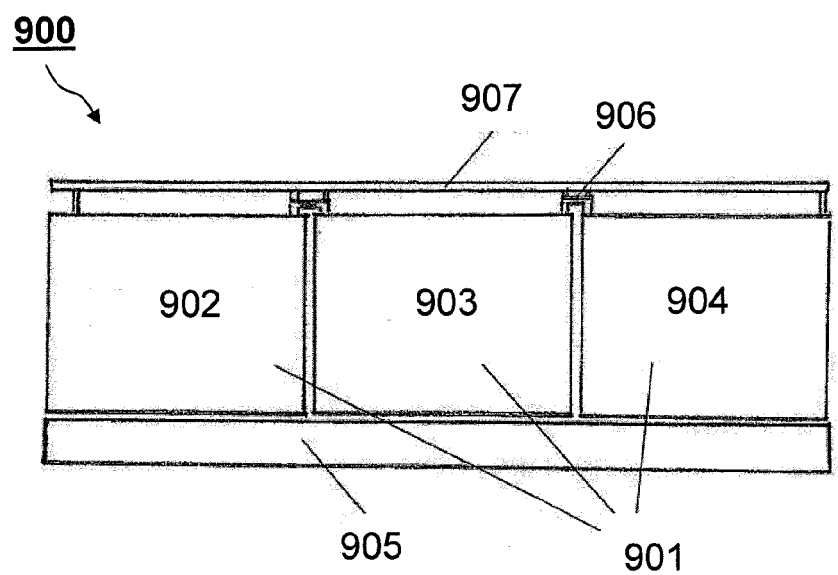
FIG. 9 is a perspective view of an alternative modular system according to an exemplary embodiment of the invention.

FIG. 9 shows a schematic view of an alternative modular system 900 according to an exemplary embodiment of the invention. In particular, a connection of a battery module, particularly of Li-ion cells, to a heat sink is shown. Shown is a battery 901, having three cell modules 902, 903, and 904, which are connected to a heat sink 905. Cell modules 902, 903, and 904 have electrical connections 906. A CSC board 907 controls cells 902, 903, and 904. According to FIG. 9, a structure of a module with cells and electrical and/or cooling components and a removable connecting unit to the cooling plate is shown. The removable connection can be realized, e.g., by a screw connection. Cooling elements are already present in the module and are brought into thermal contact with the cooling plate via this connecting unit. Thus, a complicated connection of individual cells or entire modules to the heat sink and the connection of the individual modules to one another are unnecessary.

The described exemplary embodiments are selected only by way of example and can be combined with one another.

The concepts and approaches described in this invention disclosure represent practical embodiments according to technical capabilities. Suitable variations are also conceivable, however, because of the geometric configuration of the energy storage housings or the cooling components.

The size of the base unit can be varied, as well as the number of energy storage units placed therein. Likewise, the scope of the integrated functions and interfaces can vary; for example, an external cooling, etc., is also conceivable. Likewise, the cooling in this case can occur in any conventional manner, reasonable from a technical standpoint for the specific application. Possible variants in this regard are free or forced convection, latent cooling, coolants, or cooling media.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An energy storage module for a modular system, wherein a plurality of energy storage modules are held by at least one module support, each module support having two support-side cooling fluid connections, a support-side electrical contact, and a support-side coupling element, the energy storage module being configured to accommodate at least one electrochemical energy storage unit, the energy storage module comprising:

a cooling plate with a plurality of cooling fluid channels, whereby the cooling plate forms a base plate of the energy storage module;

at least two holding surfaces attached to the cooling plate and forming side wall regions of the energy storage module, the two holding surfaces extending perpendicular to the cool plate;

two module-side cooling fluid connections configured to be connectable to the support-side cooling fluid connections, the module-side cooling fluid connections being coupled to the cooling fluid channels of the cooling plate;

a module-side electrical contact configured to be connectable to the support-side electrical contact, the module-side electrical contact being configured to be connectable to the at least one electrochemical energy storage unit; and a module-side coupling element configured to be connectable to the support-side coupling element, so that the energy storage module is attached to the module support and the module-side cooling fluid connections are connectable fluid-tight to the support-side cooling fluid connections.

2. The energy storage module according to claim 1, further comprising two cooling fluid boxes, each cooling fluid box attached to a respective one of the at least two holding surfaces, wherein one each of the module-side cooling fluid connections is arranged at one each of the cooling fluid boxes, and wherein a respective one of the at least two holding surfaces is arranged between a respective one of the cooling fluid boxes and the cooling plate, each holding surface having a through opening for conveying the cooling fluid between the respective cooling fluid boxes and the plurality of cooling fluid channels in the cooling plate.

3. The energy storage module according to claim 2, wherein the module-side coupling element is configured as a rail element that integral with and projects from a side surface of at least one of the cooling fluid boxes, so that the rail element is insertable into the support-side coupling element.

4. The energy storage module according to claim 1, wherein the module-side coupling element is configured as a hooking element, which is arranged on the holding surface of the energy storage module, so that the hooking element is hooked into the support-side coupling element.

5. The energy storage module according to claim 3, wherein the support-side coupling element is a groove, such that the rail element is slidable inside of the groove to attach the energy storage module to the module support.

6. The energy storage module according to claim 1, wherein the at least two holding surfaces are directly attached to outer side edges of the cooling plate.

7. The energy storage module according to claim 2, wherein the through opening of each holding surface is an elongated slot that is aligned with the plurality of cooling fluid channels in the cooling plate.

8. The energy storage module according to claim 7, wherein an extending direction of the elongated slot is parallel to an extending direction of the rail element.

9. The energy storage module according to claim 1, wherein the cooling plate is discrete from the at least one module support.

10. An energy storage module for a modular system, wherein a plurality of energy storage modules are held by at least one module support, each module support having two support-side cooling fluid connections, a support-side electrical contact, and a support-side coupling element, the energy storage module being configured to accommodate at least one electrochemical energy storage unit, the energy storage module comprising:

a cooling plate with a plurality of cooling fluid channels, whereby the cooling plate forms a base plate of the energy storage module;

at least two holding surfaces that form wall regions of the energy storage module;

two module-side cooling fluid connections connected to the support-side cooling fluid connections, the two module-side cooling fluid connections being coupled to the cooling fluid channels of the cooling plate;

a module-side electrical contact connected to the support-side electrical contact, the module-side electrical contact connected to the at least one electrochemical energy storage unit;

a module-side coupling element connected to the support-side coupling element, so that the energy storage module is attached to the module support and the module-side cooling fluid connections are connected fluid-tight to the support-side cooling fluid connections, two cooling fluid boxes attached to the two holding surfaces, respectively, wherein one each of the module-side cooling fluid connections is arranged at one each of the cooling fluid boxes, wherein the module-side coupling element is configured as a rail element that is integral with and projects from a side surface of at least one of the cooling fluid boxes, so that the rail element is insertable into the support-side coupling element, and wherein the support-side coupling element is a groove, such that the rail element is slidable inside of the groove to attach the energy storage module to the module support.

* * * * *

UNITED STATES PATENT AND TRADEMARK OFFICE
CERTIFICATE OF CORRECTION

| | |
|---|---|
| PATENT NO. | : 9,112,208 B2 |
| APPLICATION NO. | : 13/414359 |
| DATED | : August 18, 2015 |
| INVENTOR(S) | : Markus Kohlberger et al. |

It is certified that error appears in the above-identified patent and that said Letters Patent is hereby corrected as shown below:

On the title page

Change from:

Item (75) Inventors: Heiko NEFF, Stuttgart (DE)

To:

(75) Inventors: Heiko NEFF, Auenwald (DE)

Signed and Sealed this
Second Day of February, 2016

Michelle K. Lee
*Director of the United States Patent and Trademark Office*